US011520756B2

(12) United States Patent
Lakshminarayan et al.

(10) Patent No.: US 11,520,756 B2
(45) Date of Patent: Dec. 6, 2022

(54) DATA REDUCTION IN MULTI-DIMENSIONAL COMPUTING SYSTEMS INCLUDING INFORMATION SYSTEMS

(71) Applicant: Teradata US, Inc., San Diego, CA (US)

(72) Inventors: Choudur K. Lakshminarayan, Austin, TX (US); Thiagarajan Ramakrishnan, Austin, TX (US); Awny Kayed Al-Omari, Cedar Park, TX (US)

(73) Assignee: Teradata US, Inc., San Diego, CA (US)

( * ) Notice: Subject to any disclaimer, the term of this patent is extended or adjusted under 35 U.S.C. 154(b) by 165 days.

(21) Appl. No.: 16/724,859

(22) Filed: Dec. 23, 2019

(65) Prior Publication Data

US 2021/0191912 A1    Jun. 24, 2021

(51) Int. Cl.
*G06F 16/00*     (2019.01)
*G06F 16/215*    (2019.01)
*G06N 20/00*     (2019.01)
*G06F 16/22*     (2019.01)

(52) U.S. Cl.
CPC ........ *G06F 16/215* (2019.01); *G06F 16/2264* (2019.01); *G06N 20/00* (2019.01)

(58) Field of Classification Search
None
See application file for complete search history.

(56) References Cited

U.S. PATENT DOCUMENTS

2021/0142196 A1*   5/2021   R ..................... G06F 16/248

* cited by examiner

*Primary Examiner* — Bai D Vu
(74) *Attorney, Agent, or Firm* — Ramin Mahboubian

(57) ABSTRACT

Improved techniques for processing large-scale data and various large-scale data applications (e.g., large-scale Data Mining (DM), large-scale data analysis (LSDA)) in computing systems (e.g., Data Information Systems, Database Systems) are disclosed. Redundancy-reduced data (RRDS) can be provided as data that can be used more efficiently by various applications, especially, large-scale data applications. In doing so, at least one assumption about the distribution of a multi-dimensional data set (MDDS) and its corresponding set of responses (Y) can be made in order to reduce the multi-dimensional data set (MDDS). For example, a normal distribution (e.g., bell-shape, symmetric) can be assumed and Mutual information of the combination of a multi-dimensional set (X) and its corresponding responses (Y) can be optimized, for example, by using linear transformations, iterative numerical procedures, one or more constraints associated with the at least one assumption, and using one or more Lagrange multipliers to provide a constraint optimization function.

21 Claims, 4 Drawing Sheets

DATA REDUCTION IN MULTI-DIMENSIONAL COMPUTING SYSTEMS INCLUDING INFORMATION SYSTEMS

BACKGROUND

In the context of computing environments and systems, data can virtually encompass of all forms of information. Data can be stored in a computer readable medium (e.g., memory, hard disk). Data and in particular, one or more instances of data can also be referred to as data object(s). As is generally known in the art, a data object can for example, be an actual instance of data, a class, type, or form data, and so on. A collection of data can also be rereferred to as a data set.

The term database can also refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database (or database system) can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

A more recent development is generally known as multi-dimensional data or multi-dimensional data model. A multidimensional data model can be designed to solve complex database queries in real time. For example, A multidimensional data model can be composed of logical cubes, measures, dimensions, hierarchies, levels, and attributes.

In addition, multidimensional databases (MDBs) have also been more recently developed that can better process multi-dimensional data. A multidimensional database (or a multidimensional database management system (MDDBMS)) can effectively provide the ability to rapidly process the data in the database so that answers can be generated quickly.

Conceptually, a multidimensional database can, uses the idea of a data cube to represent the dimensions of data available to a user. For example, "sales" could be viewed in the dimensions of product model, geography, time, or some additional dimension. In this case, "sales" is known as the measure attribute of the data cube and the other dimensions are seen as feature attributes. Additionally, a database creator can define hierarchies and levels within a dimension (for example, state and city levels within a regional hierarchy).

Another more recent development is generally known as "Big Data". Big Data can refer to ways to analyze, systematically extract information from, or otherwise deal with data sets that are too large or complex to be dealt with by traditional data-processing application software. Big data challenges include capturing data, data storage, data analysis, search, sharing, transfer, visualization, querying, updating, information privacy and data source. Big data as was originally developed can be associated with three key concepts: volume, variety, and velocity.

Still another more recent develop is the development of additional applications to handle more and more data. For example, another more recent development is the development of Large-Scale Data Analysis (LSDS). LSDS can refer to the process of applying data analysis techniques to a large amount of data, typically in big data repositories. It can use specialized algorithms, systems and processes to review, analyze and present information in a form that is more meaningful for organizations or end users. Yet another more recent development is generally known in the art as "Data Mining" as a process of discovering patterns in large data sets that can involve methods at the intersection of Machine Learning, statistics, and database systems As such, Data Mining can be an interdisciplinary subfield of computer science and statistics with an overall goal to extract information (typically with "intelligent" methods) from a data set and transform the information into a comprehensible structure.

As it is also generally known in the art, Machine learning (ML) can be and/or involve scientific study of algorithms and statistical models that computer systems can use to perform a specific task without using explicit instructions, by relying on patterns and inference instead. ML can be described as a subset of Artificial Intelligence. Machine learning (ML) algorithms build a mathematical model based on sample data, known as "training data", in order to make predictions or decisions without being explicitly programmed to perform the task. Machine learning algorithms can be used in a wide variety of applications (e.g., email filtering, computer vision) where it may be difficult or infeasible to develop a conventional algorithm for effectively performing the task.

In view of the foregoing and the ever-increasing need to process more and more data for various applications in many different computing environments and systems, improved techniques for reducing the size of data of the multidimensional data would be very useful.

SUMMARY

Broadly speaking, the invention relates to computing environments and computing systems. More particularly, the invention relates to improved techniques for reducing the size of data of the multidimensional data. The improved techniques are highly suitable for processing large-scale data and various large-scale data applications (e.g., large-scale Data Mining (DM), large-scale data analysis (LSDA) in computing systems (e.g., Data Information Systems, Database Systems).

In accordance with one aspect, the improved techniques can be used to effectively eliminate less meaningful data. More particularly, the improved techniques can be used to reduce the size of a multi-dimensional data set (MDDS) to generate (or produce) a reduced data-set. Moreover, the reduced data-set can be generated as a redundancy-reduced data set (RRDS) with less redundancy ("noise" as generally known in the art). In other words, the generated redundancy-reduced data set (RRDS) can have data that has less uncorrelated data (or more data that is more correlated) thereby providing a data set that can be more "meaningful" allowing a more efficient use for various applications, especially, large-scale data applications.

In accordance with one aspect of the improved techniques, at least one assumption about the distribution of a multi-dimensional data set (MDDS) and its corresponding set of responses (Y) can be made in order to reduce the multi-dimensional data set (MDDS). It should be noted that the assumption can be made after effectively combining multi-dimensional data set (MDDS) and its corresponding set of responses (Y) so that the set of responses (Y) can also be in considered in effectively reducing the size of the multi-dimensional data set (MDDS) in accordance with another aspect.

It should also be noted that the assumption about the distribution can be used to effectively estimate what part of the data is relatively more meaningful, (e.g., has a higher correlation/covariance for predicating a result based on the data). A more meaningful data set can represent a data set that is reduced in its size by removing from it data that is of relatively less relevant.

For example, a normal distribution (e.g., bell-shape, symmetric) can be assumed to estimate what part of the multi-dimensional data set (MDDS) has relatively more relevant data (e.g., has a higher correlation/covariance) by determining an entropy (e.g., differential entropy) for a combination of a multi-dimensional set (X) and its corresponding responses (Y), as a loss function based on assuming a normal distribution in accordance with one embodiment.

It will also be that in accordance with one or more other embodiments, mutual information of the combination of a multi-dimensional set (X) and its corresponding responses (Y) can be optimized, for example, by using linear transformations, iterative numerical procedures, one or more constraints associated with the at least one assumption, and using one or more Lagrange multipliers to provide a constraint optimization function, as will be described in greater detail below.

Still other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2 depicts a method for generating a redundancy-reduced (information) data set (RRDS) as output from a multi-dimensional data set (MDDS) provided as input, in accordance with one embodiment

DETAILED DESCRIPTION

Figure 1:
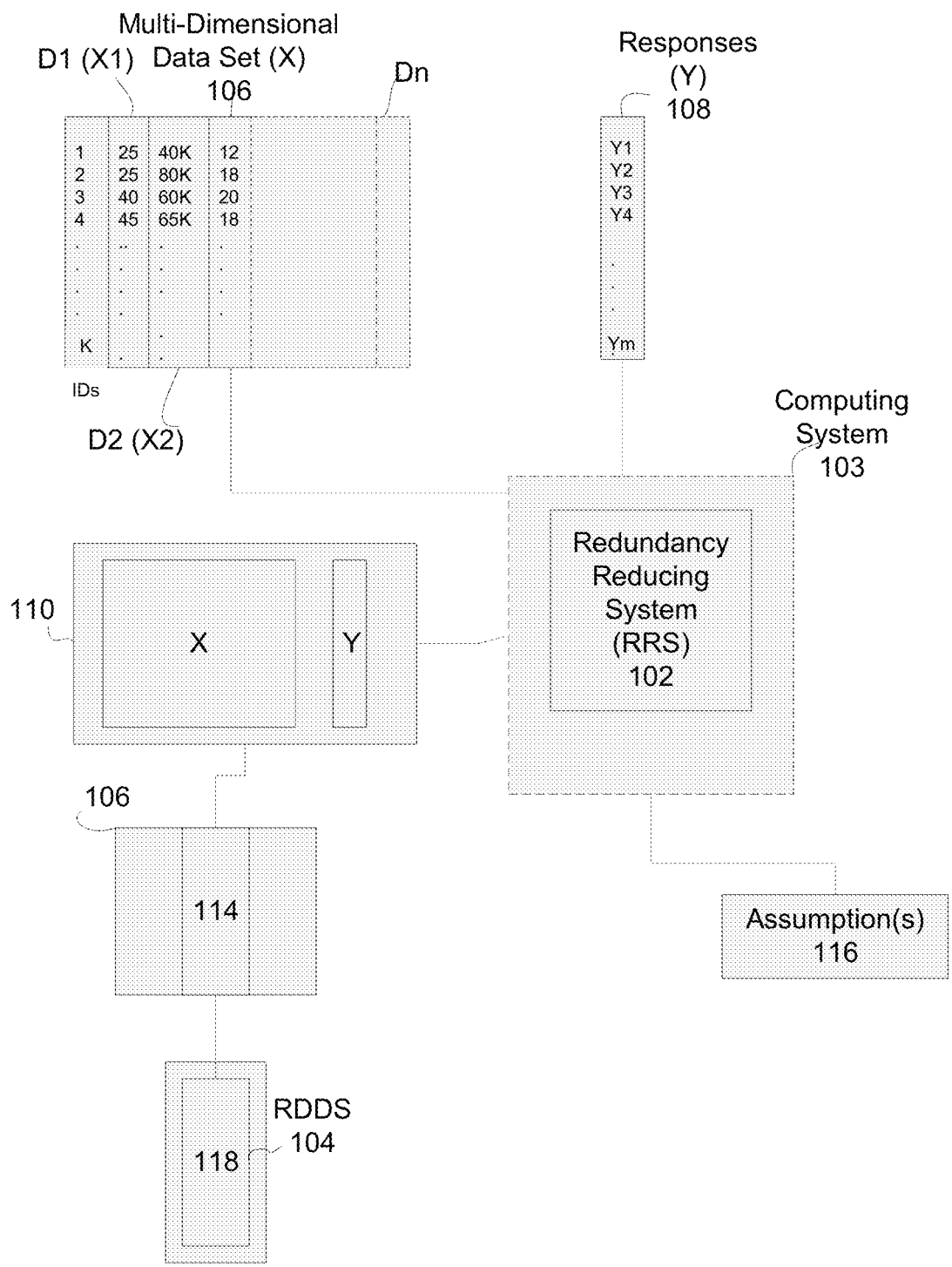
FIG. 1 depicts a Redundancy Reducing System (RRS) in a computing environment in accordance with one embodiment.

As noted in the background section, in view of a number of more recent developments (e.g., multi-dimensional data models and systems, Big Data, Machine learning, large-scale Data Analysis, large-scale Data Mining) and the ever-increasing need to store and process more and more data for various applications in many different computing environments and systems, improved techniques for reducing the size of multidimensional data would be very useful.

Accordingly, improved techniques for reducing the size of data of the multidimensional data are disclosed. The improved techniques are highly suitable for processing large-scale data and various large-scale data applications (e.g., large-scale Data Mining (DM), large-scale data analysis (LSDA) in computing systems (e.g., Data Information Systems, Database Systems).

It will be appreciated that the improved techniques can effectively eliminate less meaningful data from a data set to, among other things, allow more efficient storage and processing of the data. More particularly, the improved techniques can be used to reduce the size of a multi-dimensional data set (MDDS) to generate (or produce) a reduced data-set in accordance with one aspect. Moreover, the reduced data-set can be generated as a redundancy-reduced data set (RRDS) with less redundancy ("noise" as generally known in the art). In other words, the generated redundancy-reduced data set (RRDS) can have data that has less uncorrelated data (or more data that is relatively more correlated) thereby providing a data set that can be more "meaningful" and of reduce size, thereby allowing a more efficient use by various applications, especially, large-scale data applications (e.g., large-scale Data Mining (DM), large-scale data analysis (LSDA) in computing systems (e.g., Data Information Systems, Database Systems).

In accordance with one aspect, at least one assumption about the distribution of a multi-dimensional data set (MDDS) and its corresponding set of responses (Y) can be made in order to reduce the multi-dimensional data set (MDDS). It should be noted that the assumption can be made after effectively combining multi-dimensional data set (MDDS) and its corresponding set of responses (Y) so that the set of responses (Y) can also be in considered in effectively reducing the size of the multi-dimensional data set (MDDS) in accordance with another aspect.

It should also be noted that the assumption about the distribution can be used to effectively estimate what part of the data is relatively more meaningful, (e.g., has a higher correlation and/or covariance ("correlation") for, for example, predicating a result based on the data). A more meaningful data set can represent a data set that is reduced in its size by removing data that is relatively less relevant.

For example, a normal distribution (e.g., bell-shape, symmetric) can be assumed to estimate what part of the multi-dimensional data set (MDDS) has relatively more relevant data (e.g., has a higher correlation/covariance) by determining an entropy (e.g., differential entropy) for a combination of a multi-dimensional set (X) and its corresponding responses (Y), as a loss function based on assuming a normal distribution in accordance with one embodiment.

It will also be that in accordance with one or more other embodiments, mutual information of the combination of a multi-dimensional set (X) and its corresponding responses (Y) can be optimized, for example, by using linear transformations, iterative numerical procedures, one or more constraints associated with the at least one assumption, and using one or more Lagrange multipliers to provide a constraint optimization function, as will be described in greater detail below.

Embodiments of these aspects of the invention are also discussed below with reference to FIGS. 1-4. However, those skilled in the art will readily appreciate that the detailed description given herein with respect to these figures is for explanatory purposes as the invention extends beyond these limited embodiments.

FIG. 1 depicts a Redundancy Reducing System (RRS) 102 in a computing environment 100 in accordance with one embodiment. The Redundancy Reducing System (RRS) 102 can, for example, be provided as hardware and/or software, as it will be readily appreciated by those skilled in the art. As such, the Redundancy Reducing System (RRS) 102 can, for example, be provided as, or as a part of, a computing system 103 (e.g., a computer, a multi-processing computing system, a database system, a multi-processing or Massively Parallel (MP) database system, an information system or information processing system) and/or a computer readable medium (e.g., a non-transitory computer storage medium that stores at least executable computer code).

As a computing system 103, the Redundancy Reducing System (RRS) 102 can, for example, be provided by one or more physical processors (not shown) that each can effectively provide multiple processing units (e.g., processing cores, virtual processors, threads) that can process data in parallel (multi-processing or multi-threading the data) as it will be readily known by those skilled in the art. In addition, one or more physical processors of the exemplary computing system 103 can be configured to access memory (not shown) that stores data and/or executable computer code as it will also be readily known by those skilled in the art. As noted above, a physical processer can effectively provide multi-threading or multi-processing (e.g., one or more virtual processors, one or more processing units, Access Module Processors ("AMPs") provided, for example, by database systems available from Teradata Crop) as it will also be readily known by those skilled in the art.

In any case, the Redundancy Reducing System (RRS) 102 can generate Redundancy-Reduced Data (or information data) Set (RRDS) 104 as output for (or from) a Multi-Dimensional Data Set (MDDS) 106 provided as input, as will be described in greater detail. As such, the Redundancy Reducing System (RRS) 102 can be configured (and/or operable and/or adapted) to obtain (e.g., receive, identify, determine, search for, lookup) the Multi-Dimensional Data Set (MDDS) 106 and generate the Redundancy-Reduced Data Set (RRDS) 104 as a data set the has less redundant data (or less redundancy, or "noise") than the Multi-Dimensional Data Set (MDDS) 106. In other words, the Redundancy Reducing System (RRS) 102 can effectively eliminate form the Multi-Dimensional Data Set (MDDS) 106 a subset of the data of the Multi-Dimensional Data Set (MDDS) 106 that is relatively of less relevancy (or less relevant) in comparison to the data remaining and generated as the Redundancy-Reduced Data (RRDS) 104.

It should be noted that in generating Redundancy-Reduced Data (RRDS) 104, another data set, namely, a set of responses (Y) 108 can also be obtained by the Redundancy Reducing System (RRS) 102. The set of responses (Y) 108 can correspond to a set of responses (y1, . . . , ym) associated with the Multi-Dimensional Data Set (MDDS) 106. As shown in FIG. 1, Multi-Dimensional Data Set (MDDS) 106 includes a set of multiple dimensions (D1, . . . , Dn) such that each one of the dimensions (D1, . . . , Dn) (also can be presented as X1, . . . , Xn) includes and/or can be represented by a set of multiple input variables (e.g., a first dimension D1 includes a set of variable {25, 25, 40, 45, . . . } corresponding to a set of Identifiers (or IDs) numbered as {1, 2, 3, 4, . . . k}. A response value (yi) in the set of responses (y1, . . . , ym) can, for example, represent a predication that can be made as a quantitative value made based on, or for, one or more dimensions of the Multi-Dimensional Data Set (MDDS) 106 that can also be provided as quantitative value(s) as will be described in greater detail below.

It will be appreciated that Redundancy Reducing System (RRS) 102 can generate the Redundancy-Reduced Data (RRDS) 104 from the Multi-Dimensional Data Set (MDDS) 106 by also considering the set of responses (Y) 108. In doing so, the Redundancy Reducing System (RRS) 102 can effectively combine the Multi-Dimensional Data Set (MDDS) 106 and the set of responses (Y) 108 and estimate a subset of the Multi-Dimensional Data Set (MDDS) 106 that is of more (or possibly most) relative relevance based on the combination of the Multi-Dimensional Data Set (MDDS) 106 and the set of responses (Y) 108. At least a part of the data in the Multi-Dimensional Data Set (MDDS) 106 that is not part of the estimated subset of more relevant data can then be eliminated by the Redundancy Reducing System (RRS) 102 to generate the Redundancy-Reduced Data (RRDS) 104. It will also be appreciated that the Redundancy Reducing System (RRS) 102 can use (or can make or determine) at least one assumption about the distribution of the Multi-Dimensional Data Set (MDDS) 106 and the set of responses (Y) 108 in order to estimate (or make an estimation about) the subset of the Multi-Dimensional Data Set (MDDS) 106 that is of more relative relevance in order to generate the Redundancy-Reduced Data (RRDS) 104. Generally, the Redundancy-Reduced Data (RRDS) 104 can be generated by the Redundancy Reducing System (RRS) 102 based on the determined subset of the Multi-Dimensional Data Set (MDDS) 106 that is of more relative relevance (e.g., by eliminating at least a portion of the data that is not part of the subset determined to be of more relative importance and/or providing at least a portion of the subset determined to be of more relative importance as Multi-Dimensional Data Set (MDDS) 106.

To further elaborate, the Multi-Dimensional Data Set (MDDS) 106 can be considered as having (or including) multiple dimensions (D1-Dn) where each one the dimensions includes a number of variables each corresponding, for example, to a data point or data value. Referring to FIG. 1, a dimension D1 (or X1) can, for example, correspond to a value representing the "age" with multiple entries identified as or by identifiers 1-K. Similarly, dimensions D2 (or X2) and D3 (or X3) can, for example correspond to "income" and "years of education," and so on. The Multi-Dimensional Data Set (MDDS) 106 can be collectively represented as "X" herein. It should be noted that the set of responses (Y) 108 can be represented as a set of responses Y1-YM that can also be collectively referred to as "Y". It should also be noted that each one of the responses Y1-YM can, for example, represent a prediction made based on (or for) the one or more values of the one or more dimensions of X1-XN. Typically, multiple dimensions X1-XN of the set of responses (Y) 108 can be considered to determine a particular response in the set of responses Y1-YM. For example, a response in the set of responses Y1-Ym can represent a set of predictions regarding the "credit worthiness" of a number of individuals (1-K) in the Multi-Dimensional Data Set (MDDS) 106, respectively. A set of predictions (Yi) can, for example, made based on the respective "age", "income", "number of years of education" as provided in the dimensions D1, D2 and D3 for the individuals (1-K) in the Multi-Dimensional Data Set (MDDS) 106.

Generally, each one of the responses in the set of responses (Y1-YM) can be represent one or more quantifiable response values each representing a determined prediction value made based on one or more dimensions (X1-XN) of the multi-dimensional data set (MMDS) 106 at least partly based on a perceived correlation and/or covariance (also referred to as a "correlation" herein) between the one or more dimensions (X1-XN) of the Multi-Dimensional Data Set (MDDS) 106 and its corresponding (or respective) one or more response values in a response Yi the set of responses (Y) 108.

Referring again to FIG. 1, after the Redundancy Reducing System (RRS) 102 obtains the Multi-Dimensional Data Set (MDDS) 106 and the set of responses (Y) 108, the Redundancy Reducing System (RRS) 102 can effectively combine them to obtain a combined multi-dimensional set of input data and its corresponding responses 110 (also represented as (X*Y) herein). Thereafter, the Redundancy Reducing System (RRS) 102 can estimate (or make an estimation about) a more or most (referred to as "more" herein) relatively relevant subset of data of the Multi-Dimensional Data Set (MDDS) 106 based on an assumption 116 about the distribution of the Multi-Dimensional Data Set (MDDS) 106 and the set of responses (Y) 108. It should be noted that the more relevant subset of data of the Multi-Dimensional Data Set (MDDS) 106 is depicted in FIG. 1. Also, the subset of more relevant data 114 that can be produced as at least in part as data 118 in the Redundancy-Reduced Data (RRDS) 104 provided as output by the Redundancy Reducing System (RRS) 102. In other words, the subset of more relevant data 114 can be determined based on the assumption 116 in view of the combination of the multi-dimensional set of data set (X) 106 and its corresponding responses (Y) 108 (the combination us shown as 110 (X*Y) in FIG. 1). By way of example, as an assumption 116, a normal distribution (e.g., bell-shape, symmetric) or an asymmetric distribution of the Multi-Dimensional Data Set (MDDS) 106 (X) and the set of responses (Y) 108 can be assumed.

As will be described in greater detail, the Redundancy Reducing System (RRS) 102 can estimate the more relevant subset 114 of the Multi-Dimensional Data Set (MDDS) 106 by effectively determining "mutual information" between the Multi-Dimensional Data Set (MDDS) 106 and the set of responses (Y) 108 in the combined multi-dimensional set of input data and its corresponding responses 110. By way of example, this estimation of the mutual information between the Multi-Dimensional Data Set (MDDS) 106 and the set of responses (Y) 108 can be made by the Redundancy Reducing System (RRS) 102 at least partly based on using a normal distribution model as an assumption mode, or using one or more histograms of the one or more dimensions X1-XN of the Multi-Dimensional Data Set (MDDS) 106 and one or more responses in the set of responses (Y) 108.

As will also be described in greater detail, the Redundancy Reducing System (RRS) 102 can determine an entropy (e.g., differential entropy) of the combined multi-dimensional set of input data and its corresponding responses 110. This entropy can, for example, be determined, as a loss function, based on at least one assumption 116 about the distribution of and the set of responses (Y) 108. For example, mutual information between a first transformation vector (Z) and a second transformed vector (U) can be maximized as a function of their correlation and/or covariance. In the example, the transformation vector (Z) can be a transformed vector of a vector associated with at least one dimension of the multiple dimensions X1-XN of the Multi-Dimensional Data Set (MDDS) 106, and the second transformed vector (U) can be a transformed vector of at least one vector associated with one or more responses of the set of responses Y1-YN. This can, for example, be achieved by optimizing the "mutual information" by at least using one or more iterative numerical procedures, as those skilled in the art will appreciate. Also, optimization of the "mutual information" can be implemented at least partly by using parallel processing, for example, on a parallel computing system that includes one or more physical processors that effectively provide multiple processing units or threads that operate in parallel to perform the optimizing of the "mutual information". Typically, a parallel computing system that can offer relatively higher computing and/or processing capacity so it is better suited to process relatively large data sets.

It should also be noted that the Redundancy Reducing System (RRS) 102 can estimate the more relevant subset 114 by obtaining and/or using one or more constraints associated with the at least one assumption 116, for example, by using one or more Lagrange multipliers to provide a constraint optimization function, in accordance with one embodiment, as those skilled in the art will appreciate.

By way of example, the Multi-Dimensional Data Set (MDDS) 106 can be provided and stored in one or more database tables of a database in a number of rows and columns as it can currently be implemented in at least some databases and information systems today. As such, In accordance with one exemplary embodiment, the Redundancy Reducing System (RRS) 102 can, for example, obtain each dimension of a multi-dimensional data set (MDDS) 106 as one or more rows of one or more database tables stored in a database, and represent each one of the rows of the database table as an original input vector in an original input (variable) space. The Redundancy Reducing System (RRS) 102 can then use a linear transformation to project each one of the original input vectors into a new corresponding input space as a corresponding input subspace of its original input space to generate multiple transformed input vectors. Similarly, the Redundancy Reducing System (RRS) 102 can obtain each one of the responses in the corresponding set of responses (Y) 108 of the multi-dimensional data set (MDDS) as one or more rows of response data stored in one or more database tables stored in the database, represent the response data of the database table as an original response vector in an original response space, and then use a linear transformation to project the original response vector into a new corresponding space as a corresponding response subspace of its original response space to generate at least one transformed response vector.

In the exemplary embodiment, after performing the linear transformation noted above, the Redundancy Reducing System (RRS) 102 can proceed to effectively maximize mutual information between the multiple transformed input vectors and the transformed response vector by at least: generating a probably density function as a derivative of the data to obtain a sample covariance of the multiple transformed input vectors and the transformed response vector to obtain an original "mutual information" of the obtained multi-dimensional data set (MDDS). Thereafter, the Redundancy Reducing System (RRS) 102 can optimize the obtained mutual information by at least partly using one or more Lagrange multipliers to impose one or more constraint optimization functions, to obtain an optimized "mutual information" between the multiple transformed input vectors and the transformed response vector before outputting a redundancy-reduced data set (or redundancy-reduced information data set) (RRDS).

In addition, the Redundancy Reducing System (RRS) 102 can be configured to output redundancy-reduced data set (RRDS) as a Machine Learning (ML) model data set and effectively use one or more Machine Learning (ML) techniques to process the model data Machine Learning (ML) model data set. In doing so, the Redundancy Reducing System (RRS) 102 can, for example, obtain additional data for one or more dimensions of a multiple dimensions of multi-dimensional data set (MDDS), and use one or more Machine Learning (ML) techniques to process the additional data to generate a reduced set of data for the additional.

Figure 2:
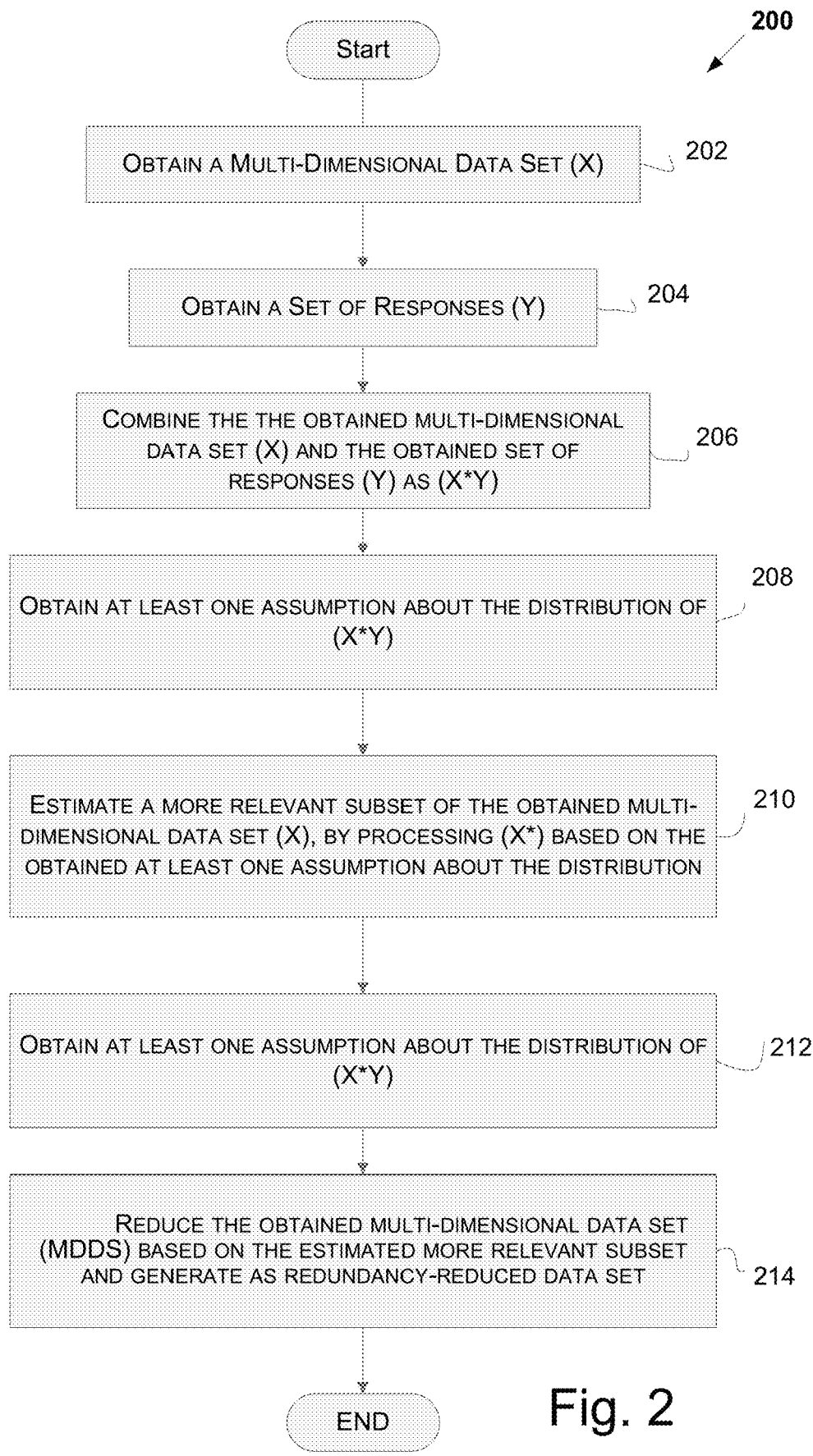
FIG. 2 depicts

To elaborate further, FIG. 2 depicts a method 200 for generating a redundancy-reduced (information) data set (RRDS) as output from a multi-dimensional data set (MDDS) provided as input, in accordance with one embodiment. It should be that multi-dimensional data set (MDDS) can, for example, be processed as information in an information data system (IDS) implemented at least partly by a computer (or computing) system. The computer system can include one or more physical processors configured (operable) to execute executable code, such that the computer-implemented method is implemented at least partly by the one or more physical processors of the information data (or data processing) system (IDS). Method 200 can, for example, be implemented as a computer-implemented method. As such, the Method 200 can, for example, be implemented at least partly by the Redundancy Reducing System (RRS) 102 (shown in FIG. 1).

Referring to FIG. 2, initially, a multi-dimensional data set (MDDS) is obtained (202). It should be noted that the obtained (202) multi-dimensional data set (MMDS) includes a set of multiple dimensions, such that each one of the dimensions of the multi-dimensional data set (MMDS) is represented by a set of multiple input variables. In addition, a set of responses (Y) for the multi-dimensional data set (MDDS) is obtained (204) such that each one of the responses in the set of responses (Y) is one or more quantifiable response values each representing a determined prediction value made based on one or more dimensions of the multi-dimensional data set (MMDS). A prediction value can be determined at least partly based on a perceived correlation between the one or more dimensions of the multi-dimensional data set (MMDS) and its respective response value(s) in the set of responses (Y).

Thereafter, the multi-dimensional data set (MDDS) and the set of responses (Y) are combined (206) to obtain or generate a combined multi-dimensional set of input data and its corresponding responses (X*Y). In addition, at least one assumption about the distribution of the obtained (202) multi-dimensional data set (MDDS) and the obtained (204) set of responses (Y) in the combined multi-dimensional set of input data and its corresponding responses (X*Y) is obtained (208). It should be noted this assumption can be obtained (208) before or after the multi-dimensional data set (MDDS) and the set of responses (Y) are combined (206). An assumption can, for example, assume a normal distribution (e.g., bell-shape, symmetric), or assume an asymmetric distribution.

In any case, based on the obtained (208) assumption(s), a relatively more (or most) relevant subset of the data obtained (202) multi-dimensional data set (MDDS) can be estimated (210) by processing the combined (206) multi-dimensional set of input data and its corresponding responses (X*Y) at least partly based on the obtained (208) assumption(s). By way of example, "mutual information" between (i) the obtained (202) multi-dimensional data set (MDDS) and (ii) the obtained (204) set of responses (Y) can be estimated by at least partially using a normal distribution model as an assumption model. As another example, "mutual information" between (i) the obtained (202) multi-dimensional data set (MDDS) and (ii) the obtained (204) set of responses (Y) can be estimated by at least partially using one or more histograms of (i) one or more dimensions of the obtained (202) multi-dimensional data set (MDDS) and (ii) one or more if the obtained (204) set of responses (Y). Typically, a histogram can be generated and/or used when a normal distribution is not assumed (I.e., the assumption is that the distribution is asymmetric). It should also be noted that the estimating (210) can, for example, be made by determining an entropy (e.g., a differential entropy) of the combined (206) multi-dimensional set of input data and its corresponding responses (X*Y), as a loss function, based on the at least one assumption obtained (208) about the distribution of the combined (206) multi-dimensional set of input data and its corresponding responses (X*Y). Also, estimating (210) of a relatively more relevant subset can, for example, be made by maximizing "mutual information" between a first transformation vector (Z) and a second transformed vector (U) as a function of their correlation and/or covariance ("correlation") such that the transformation vector (Z) is a transformed vector of a vector associated with at least one dimension of the multiple dimensions of the multi-dimensional data set (MDDS), and the second transformed vector (U) is a transformed vector of at least one vector associated with the set of responses (Y) for the multi-dimensional data set.

The maximizing of the mutual information between a first transformation vector (Z) and a second transformed vector (U) as a function of their correlation can, for example, be performed at least by optimizing the "mutual information" by at least using one or more iterative numerical procedures. The optimizing of the more relevant subset of the obtained multi-dimensional data set (MDDS) can, for example, be made at least partly based on one or more constraints associated with the at least one assumption made about the distribution of (i) the obtained (202) multi-dimensional data set (MDDS) and (ii) the obtained (204) set of responses (Y) in the combined multi-dimensional set of input data and its corresponding responses (X*Y) that has also been obtained (208). The one or more constraints associated with the at least one assumption made about the distribution can be obtained and used to estimate a relatively more relevant subset of the multi-dimensional data set (MDDS), by processing the combined multi-dimensional set of input data and its corresponding responses (X*Y), based on the at least one assumption. For example, one or more Lagrange multipliers can be used to provide a constraint optimization function in order to optimize the relevant subset of the obtained multi-dimensional data set (MDDS) based on one or more constraints associated with the at least one assumption.

Thereafter, the obtained (202) multi-dimensional data set (MDDS) can be reduced (214) based on the estimated relatively more relevant subset of the obtained (202) multi-dimensional data set (MDDS) for example, by at least eliminating another subset of data from the multi-dimensional data set (MDDS), thereby generating a redundancy-reduced data (or information data) set (RRDS) as output from the input multi-dimensional data set (MDDS). The method 200 can end after the redundancy-reduced data set (RRDS) is produced as output.

As noted above, linear transformations can be used and "mutual information" between a multi-dimensional data set (MDDS) and a corresponding set of response (Y) can be optimized in order to estimate a subset of higher (or of more) relevancy in a multi-dimensional data set (MDDS).

Figure 3:
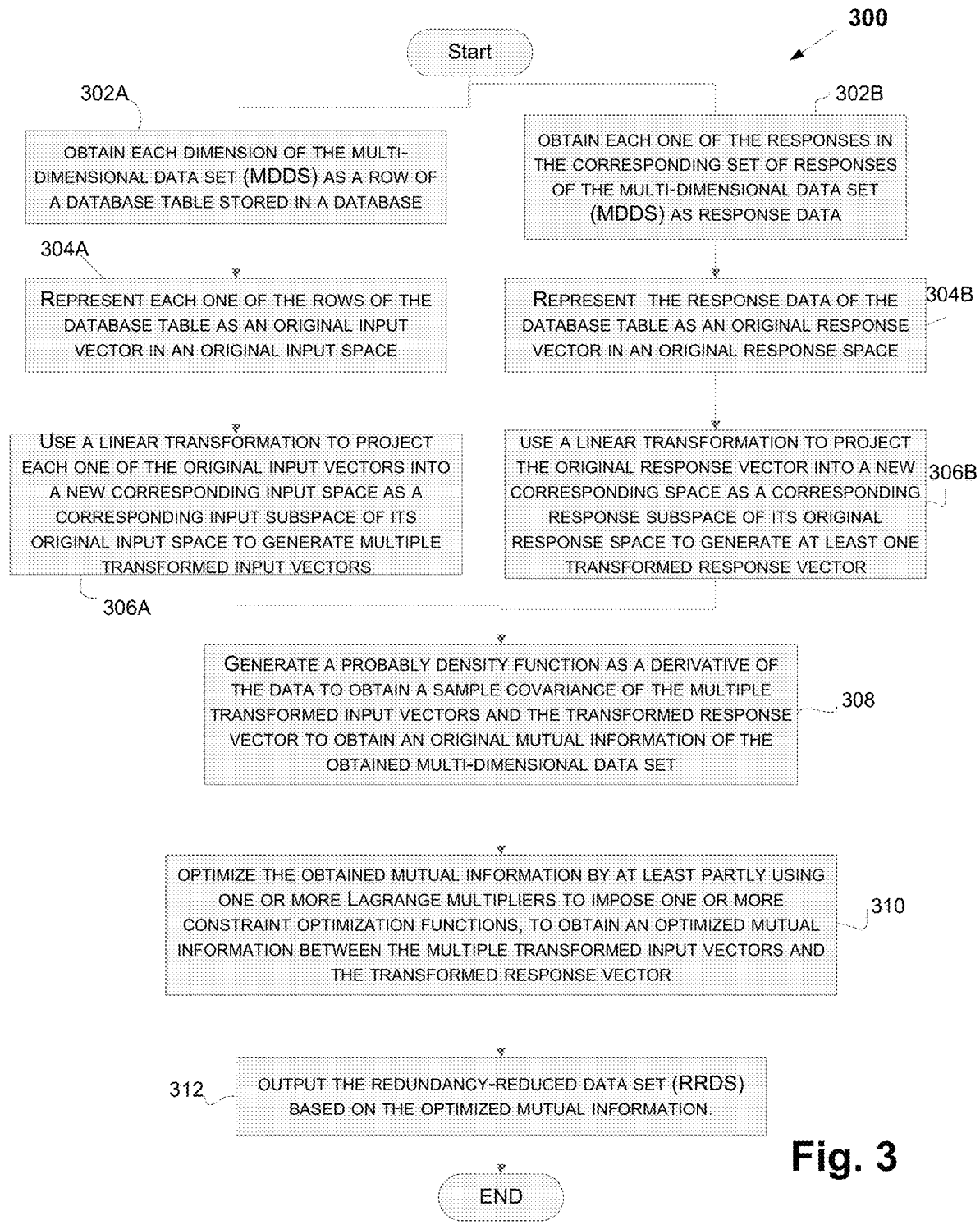
FIG. 3 depicts a method for maximizing "mutual information" between a multi-dimensional data set (MDDS) and it its corresponding responses data set (or responses) in accordance with one embodiment FIG. 4 a Dimensionality Reduction Pipeline (also shown in Appendix A) in accordance with one embodiment.

To elaborate even further, FIG. 3 depicts a method 300 for maximizing "mutual information" between a multi-dimensional data set (MDDS) and it its corresponding responses data set (or responses) in accordance with one embodiment. It should be that multi-dimensional data set (MDDS) can, for example, be processed as information in an information data system (IDS) implemented at least partly by a computer (or computing) system. The computer system can include one or more physical processors configured (operable) to execute executable code, wherein the computer-implemented method is implemented at least partly by the one or more physical processors. Method 300 can, for example, be implemented as computer-implemented method. As such, the Method 300 can, for example, be implemented at least partly by the Redundancy Reducing System (RRS) 102 (shown in FIG. 1).

Referring to FIG. 3, initially, each dimension of the multi-dimensional data set (MDDS) is obtained (302A) as one or more rows of a one or more database tables stored in a database. Then, each one of the rows of the database table is represented (304A) as an original input vector in an original input (variable) space. Thereafter, a linear transformation is used to project (306A) each one of the original input vectors into a new corresponding input space as a corresponding input subspace of its original input space to generate multiple transformed input vectors.

It should be noted that similar operations can be performed each one of the responses in the corresponding set of responses, possibly at the same time, as each dimension of the multi-dimensional data set is obtained (302A), represented (304A) and processed (306A). Namely, each one of the responses in the corresponding set of responses of the multi-dimensional data set (MDDS) can be obtained (302B) as response data stored, for example, in one or more database tables stored in a database and represented (304B) as an original response vector in an original response space before using a linear transformation to project (306C) the original response vector into a new corresponding space as a corresponding response subspace of its original response space to generate at least one transformed response vector.

After the linear transformations of vectors have been projected (306A and 306B) them into new spaces, the method 300 can proceed to optimize the "mutual information" between the multiple transformed input vectors and the transformed response vector. In doing so, a probably density function can be generated (308) as a derivative of the data to obtain a sample covariance of the multiple transformed input vectors and the transformed response vector to obtain an initial (or original) "mutual information" of the obtained multi-dimensional data set (MDDS). Then, the obtained initial "mutual information can be optimized or (further optimized) (310) by at least partly using one or more Lagrange multipliers to impose one or more constraint optimization functions, to obtain an optimized mutual information between the multiple transformed input vectors and the transformed response vector. Based on the optimized mutual information, Method 300 can then output (312) the redundancy-reduced data set (RRDS). This can, for example, be done merely by elimination data or one or more dimensions of data that is not part of the optimized mutual information. The method 300 can end after the redundancy-reduced data set (RRDS).

To elaborate even further, Appendix A provides in greater detail information about Dimensionality Reduction, Linear Methods and Information Theory in the context of one or aspects and/or embodiment of the improved techniques.

Figure 4:
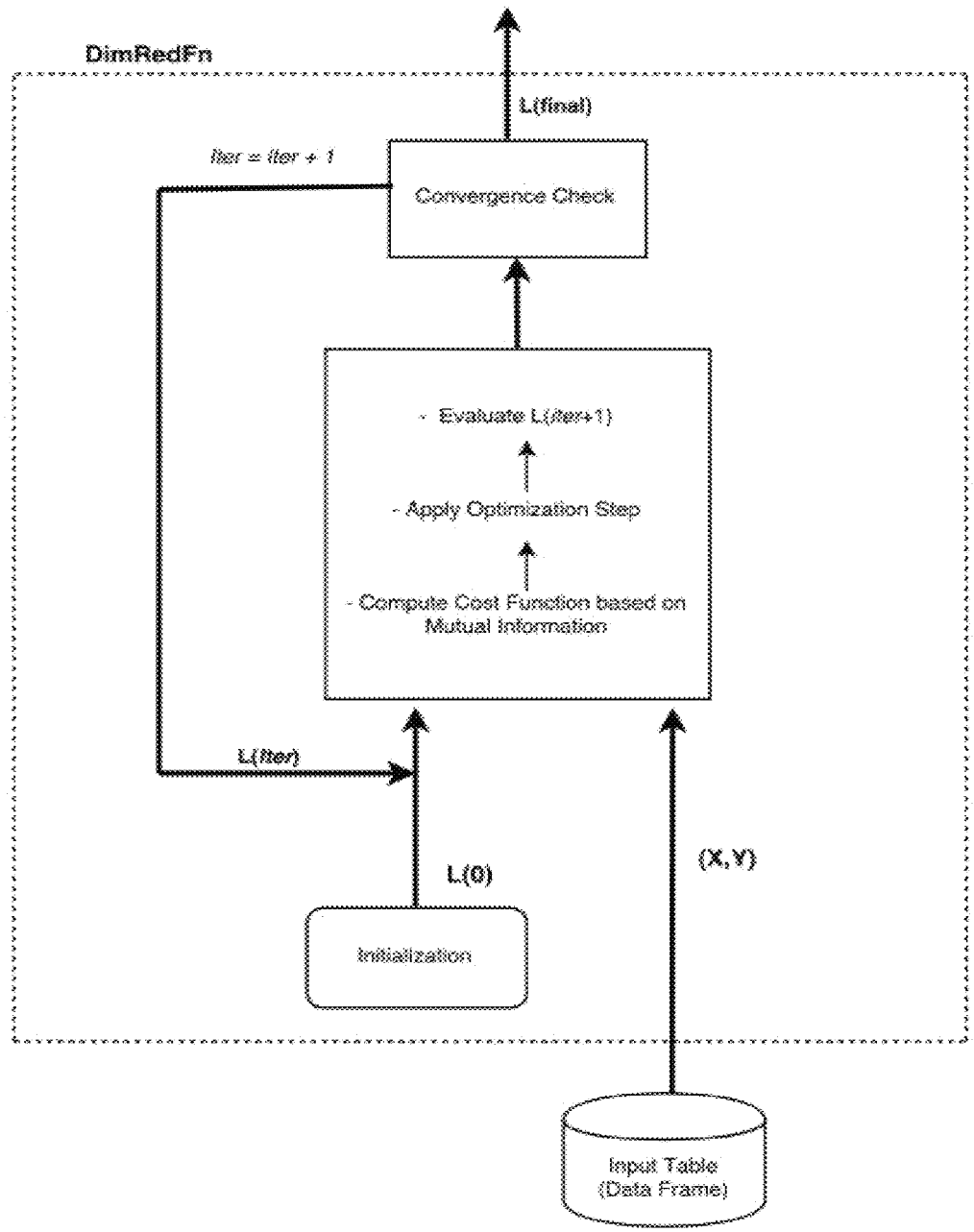

FIG. 4 depicts a Dimensionality Reduction Pipeline (also shown in Appendix A) in accordance with one embodiment. Generally, (i) a parametric approach to estimating Mutual Information between the predictor variables (X) and response variables (Y) can be taken, (ii) more than one Response variable ($Y_i$, i=1, 2, . . . , m) can be admitted, (iii) and Continuous and Categorical feature and Response variables can be admitted. An outline of the procedure is depicted in FIG. 4 as Dimensionality Reduction Pipeline.

It should be noted that in large-scale data analysis, especially predictive analytics, it is desirable to express concisely relationships between the independent variables and response variable y. In other words, a precise representation of the vector x that encodes relevant information in predicting the response y is desirable. This problem may be viewed as "squeezing" the vector x through transformations to produce a concisely coded version of x relevant for predicting y. In the Deep Learning literature, this problem is known as the 'bottleneck' principle, as proposed by Tishby et al. Principal component analysis (PCA) and Canonical Correlation Analysis (CCA) as known in the art. In accordance with one aspect the improved techniques, Dimensionality Reduction can be performed based on mutual information (or Mutual Information Based Dimensionality reduction (MIDR)). While, this has been an active area of research, it has presented serious challenges largely due to computational complexity of non-parametric density estimation, curse of dimensionality, and gross approximations.

It should also be noted that a Gaussian distribution can easily be replaced by other parametric densities, most notably, the exponential families. Restricted to a parametric family as in the case of the Gaussian, the estimation of Mutual Information reduces to maximum likelihood estimation of the 1st and 2nd moments which are the mean vector and the covariance matrix respectively. This approach then lends itself to solutions that can be simple, elegance, and practical when applied in various applications.

Appendix A also provides more information about Principal Component Analysis in (PCA). Principal components analysis (PCA) is one member of a family of methods for dimensionality reduction. It is a technique that involves transformations of set of variables into a smaller set of uncorrelated variables, while retaining intrinsic information in the original data set by exploiting correlations among the variables. PCA can be merely a linear projection of a set of observed variables on to basis vectors which turn out to be Eigen vectors when their covariance is maximized. PCA can be one of the simplest and most common ways of doing dimensionality reduction.

Appendix A also provides information about Canonical Correlation Analysis (CCA) Canonical Correlation Analysis (CCA) may be viewed as an extension of Principal components analysis (PCA). Generally, CCA deals with finding associations between two sets of random vectors by maximizing the correlations between linear transformations of vectors X and Y into another set of vectors U and V, where U=XL and V=Y W.

Appendix A also provides in greater detail techniques for Linear Projections and Feature Reduction, Differential Entropy, Mutual Information, and Optimization. In particular, an exemplary probably density function, and an exemplary constrained optimization function are described.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of generating a redundancy-reduced data set (RRDS) as output from a multi-dimensional data set (MDDS) provided as input, wherein the multi-dimensional data set (MDDS) can be processed as information in an information data system (IDS) implemented at least partly by a computer system, wherein the computer system includes one or more physical processors configured to execute executable code, wherein the computer-implemented method is implemented at least partly by the one or more physical processors of the information data system (IDS), and wherein the computer-implemented method comprises:
    obtaining, by the information data system (IDS), the multi-dimensional data set (MDDS), wherein the multi-dimensional data set (MMDS) includes a set of multiple dimensions, wherein each one of the dimensions of the multi-dimensional data set (MMDS) includes a set of input variables;
    obtaining, by the information data system, a set of responses (Y) for the multi-dimensional data set (MDDS), wherein each one of the responses in the set of responses (Y) is one or more quantifiable response values each representing one or more determined prediction values made based on the one or more dimensions of the multi-dimensional data set (MMDS) at least partly based on a perceived correlation between the one or more dimensions of the multi-dimensional data set (MMDS) and its one or more respective response values in the set of responses (Y);
    combining, by the information data system, the obtained multi-dimensional data set (MDDS) and the obtained set of responses (Y) as a combined multi-dimensional set of input data and its corresponding responses (X*Y);
    obtaining at least one assumption about distribution of (i) the obtained multidimensional data set (MDDS) and (ii) the obtained set of responses (Y) in the combined multidimensional set of input data and its corresponding responses (X*Y);
    estimating, by the information data system, a more relevant subset of the obtained multidimensional data set (MDDS), by processing the combined multi-dimensional set of input data and its corresponding responses (X*Y), based on the obtained at least one assumption about the distribution of: (1) the obtained multi-dimensional data set (MDDS) and (ii) the obtained set of responses (Y) in the combined multi-dimensional set of input data and its corresponding responses (X*Y); and
    reducing, by the information data system, the obtained multi-dimensional data set (MDDS) based on the estimated more relevant subset of the obtained multi-dimensional data set (MDDS) thereby generating a redundancy-reduced data set (RRDS) as output from the input multidimensional data set (MDDS).

2. The computer-implemented method of claim 1, wherein the least one assumption about the distribution of correlation/relationships of/between (i) the obtained multi-dimensional data set (MDDS) and (ii) the obtained set of responses (Y) in the combined multi-dimensional set of input data and its corresponding responses (X*Y) is one of the following: (i) a normal distribution, and (ii) an asymmetric distribution.

3. The computer-implemented method of claim 1, wherein the estimating of the more relevant subset of the obtained multi-dimensional data set (MDDS), by processing the combined multi-dimensional set of input data and its corresponding responses (X*Y), based on the at least one assumption, further comprises:

estimating mutual information between (i) the obtained multi-dimensional data set (MDDS) and (ii) the obtained set of responses (Y) by at least partially using a normal distribution model as an assumption model.

4. The computer-implemented method of claim 1, wherein the estimating of the more relevant subset of the obtained multi-dimensional data set (MDDS), by processing the combined multi-dimensional set of input data and its corresponding responses (X*Y), based on the at least one assumption, further comprises:

estimating mutual information between (i) the obtained multi-dimensional data set (MDDS) and (ii) the obtained set of responses (Y) by at least partially using one or more histograms of (i) one or more dimensions of the obtained multi-dimensional data set (MDDS) and (ii) one or more of the obtained set of responses (Y).

5. The computer-implemented method of claim 1, wherein the estimating of the more relevant subset of the obtained multi-dimensional data set (MDDS), by processing the combined multi-dimensional set of input data and its corresponding responses (X*Y), based on the at least one assumption, further comprises:

determining an entropy, of the combined multi-dimensional set of input data and its corresponding responses (X*Y), as a loss function, based on the at least one assumption about the distribution of the combined multi-dimensional set of input data and its corresponding responses (X*Y).

6. The computer-implemented method of claim 5, wherein the estimating of the more relevant subset of the obtained multi-dimensional data set (MDDS), by processing the combined multi-dimensional set of input data and its corresponding responses (X*Y), based on the at least one assumption, further comprises:

maximizing mutual information between a first transformation vector (Z) and a second transformed vector (U) as a function of their correlation, wherein the transformation vector (Z) is a transformed vector of a vector associated with at least one dimension of the multiple dimensions of the multi-dimensional data set (MDDS), and wherein the second transformed vector (U) is a transformed vector of at least one vector associated with the set of responses (Y) for the multi-dimensional data set.

7. The computer-implemented method of claim 6, wherein the maximizing of the mutual information between a first transformation vector (Z) and a second transformed vector (U) as a function of their correlation/covariance further comprises:

optimizing the mutual information by at least using one or more iterative numerical procedures.

8. The computer-implemented method of claim 7, wherein the optimizing is implemented at least partly by a parallel computing system that includes one or more physical processors that effectively provide multiple processing units that operate in parallel to perform the optimizing.

9. The computer-implemented method of claim 6, wherein the estimating of the more relevant subset of the obtained multi-dimensional data set (MDDS), by processing the combined multi-dimensional set of input data and its corresponding responses (X*Y), based on the at least one assumption, further comprises:

optimizing the relevant subset of the obtained multi-dimensional data set (MDDS) based on one or more constraints associated with the at least one assumption.

10. The computer-implemented method of claim 9, wherein the wherein the estimating of the more relevant subset of the obtained multi-dimensional data set (MDDS), by processing the combined multi-dimensional set of input data and its corresponding responses (X*Y), based on the at least one assumption, further comprises:

obtaining and using one or more constraints associated with the at least one assumption.

11. The computer-implemented method of claim 9, wherein the optimizing of the relevant subset of the obtained multi-dimensional data set (MDDS) based on one or more constraints associated with the at least one assumption further comprises:

using one or more Lagrange multipliers to provide a constraint optimization function.

12. The computer-implemented method of claim 1, wherein the estimating of the more relevant subset of the obtained multi-dimensional data set (MDDS), by processing the combined multi-dimensional set of input data and its corresponding responses (X*Y), based on the at least one assumption, further comprises:

obtaining each dimension of the multi-dimensional data set (MDDS) as one or more rows of one or more database tables stored in a database; representing each one of the rows of the database tables as an original input vector in an original input space;

using a linear transformation to project each one of the original input vectors into a new corresponding input space as a corresponding input subspace of its original input space to generate multiple transformed input vectors;

obtaining each one of the responses in the corresponding set of responses of the multi-dimensional data set (MDDS) as response data stored in one or more rows of one or more database tables stored in a database; representing the response data of the database table as an original response vector in an original response space; using a linear transformation to project the original response vector into a new corresponding space as a corresponding response subspace of its original response space to generate at least one transformed response vector;

maximizing mutual information between the multiple transformed input vectors and the transformed response vector by at least: generating a probably density function as a derivative of the data to obtain a sample covariance of the multiple transformed input vectors and the transformed response vector to obtain an original mutual information of the obtained multi-dimensional data set (MDDS);

optimizing the obtained mutual information by at least partly using one or more Lagrange multipliers to impose one or more constraint optimization functions, to obtain an optimized mutual information between the multiple transformed input vectors and the transformed response vector; and outputting the redundancy-reduced data set (RRDS) based on the optimized mutual information.

13. The computer-implemented method of claim 1, wherein the computer-implemented method further comprises:

outputting the redundancy-reduced data set (RRDS) as a Machine Learning (ML) model data set; using one or more Machine Learning (ML) techniques to process the model data Machine Learning (ML) model data set.

14. The computer-implemented method of claim 13, wherein the computer-implemented method further comprises:
    obtaining additional data for one or more dimensions of the multiple dimensions of multi-dimensional data set (MDDS); and
    using one or more Machine Learning (ML) techniques to process the additional data to generate a reduced set of data for the additional data.

15. The computer-implemented method of claim 1, where the reducing, by the information data system, of the obtained multi-dimensional data set (MDDS) based on the estimated more relevant subset of the obtained multi-dimensional data set (MDDS) is performed at least by:
    eliminating another subset of data from the multi-dimensional data set (MDDS) thereby generating the redundancy-reduced data set (RRDS) as output from the input multi-dimensional data set (MDDS).

16. The computer-implemented method of claim 1, wherein the reducing of the obtained multi-dimensional data set (MDDS) based on the estimated more relevant subset of the obtained multi-dimensional data set (MDDS) further comprises: generating the estimated more relevant subset of the obtained multi-dimensional data set (MDDS) as the output redundancy-reduced data set (RRDS).

17. A computing system, comprising:
    memory configured to store at least data; and
    one or more processors configured to:
        obtain a multi-dimensional data set (MDDS), wherein the multi-dimensional data set (MMDS) includes a set of multiple dimensions, wherein each one of the dimensions of the multi-dimensional data set (MMDS) includes a set of input variables;
        obtain a set of responses (Y) for the multi-dimensional data set (MDDS), wherein each one of the responses in the set of responses (Y) is one or more quantifiable response values each representing one or more determined prediction values made based on one or more dimensions of the multi-dimensional data set (MMDS) at least partly based on a perceived correlation between the one or more dimensions of the multi-dimensional data set (MMDS) and its one or more respective response values in the set of responses (Y);
        combine the obtained multi-dimensional data set (MDDS) and the obtained set of responses (Y) as a combined multi-dimensional set of input data and its corresponding responses (X*Y);
        obtain at least one assumption about distribution of (i) the obtained multi-dimensional data set (MDDS) and (ii) the obtained set of responses (Y) in the combined multi-dimensional set of input data and its corresponding responses (X*Y);
        estimate a relatively more relevant subset of the obtained multi-dimensional data set (MDDS), by processing the combined multi-dimensional set of input data and its corresponding responses (X*Y), based on the obtained at least one assumption about the distribution of: (i) the obtained multi-dimensional data set (MDDS) and (ii) the obtained set of responses (Y) in the combined multi-dimensional set of input data and its corresponding responses (X*Y); and
        reduce the obtained multi-dimensional data set (MDDS) based on the estimated relatively more relevant subset of the obtained multi-dimensional data set (MDDS) thereby generating a redundancy-reduced data set (RRDS) as output from the input multi-dimensional data set (MDDS).

18. The computing system of claim 17, wherein the estimating of the more relevant subset of the obtained multi-dimensional data set (MDDS), by processing the combined multi-dimensional set of input data and its corresponding responses (X*Y), based on the at least one assumption, further comprises:
    determining an entropy, of the combined multi-dimensional set of input data and its corresponding responses (X*Y), as a loss function, based on the at least one assumption about the distribution of the combined multi-dimensional set of input data and its corresponding responses (X*Y).

19. The computing system of claim 18, wherein the estimating of the more relevant subset of the obtained multi-dimensional data set (MDDS), by processing the combined multi-dimensional set of input data and its corresponding responses (X*Y), based on the at least one assumption, further comprises:
    obtaining each dimension of the multi-dimensional data set (MDDS) as a row of a database table stored in a database;
    representing each one of the rows of the database table as an original input vector in an original input space; using a linear transformation to project each one of the original input vectors into a new corresponding input space as a corresponding input subspace of its original input space to generate multiple transformed input vectors; obtaining each one of the responses in the corresponding set of responses of the multi-dimensional data set (MDDS) as response data stored in another database table stored in the database;
    representing the response data of the database table as an original response vector in an original response space;
    using a linear transformation to project the original response vector into a new corresponding space as a corresponding response subspace of its original response space to generate at least one transformed response vector; maximizing mutual information between the multiple transformed input vectors and the transformed response vector by at least:
    generating a probably density function as a derivative of the data to obtain a sample covariance of the multiple transformed input vectors and the transformed response vector to obtain an original mutual information of the obtained multi-dimensional data set (MDDS);
    optimizing the obtained mutual information by at least partly using one or more Lagrange multipliers to impose one or more constraint optimization functions, to obtain an optimized mutual information between the multiple transformed input vectors and the transformed response vector; and
    outputting the redundancy-reduced data set (RRDS) based on the optimized mutual information.

20. A non-transitory computer readable storage medium storing at least executable code for estimating a more relevant subset of a multi-dimensional data set (MDDS), wherein executable code when executed performs at least the following:
    obtains each dimension of the multi-dimensional data set (MDDS) as one or more rows of one or more database tables stored in a database;
    represents each one of the rows of the database table as an original input vector in an original input space;
    uses a linear transformation to project each one of the original input vectors into a new corresponding input space as a corresponding input subspace of its original input space to generate multiple transformed input vectors;

obtains each one of responses in a corresponding set of responses of the multi-dimensional data set (MDDS) as response data stored in one or more database tables stored in a database;

represents the response data of the database table as an original response vector in an original response space;

uses a linear transformation to project the original response vector into a new corresponding space as a corresponding response subspace of its original response space to generate at least one transformed response vector;

maximizes mutual information between the multiple transformed input vectors and the transformed response vector by at least:

generating a probably density function as a derivative of the data to obtain a sample covariance of the multiple transformed input vectors and the transformed response vector to obtain an original mutual information of the obtained multi-dimensional data set (MDDS);

optimizing the obtained mutual information by at least partly using one or more Lagrange multipliers to impose one or more constraint optimization functions, to obtain an optimized mutual information between the multiple transformed input vectors and the transformed response vector; and outputting the redundancy-reduced data set (RRDS) based on the optimized mutual information.

21. A computer-implemented method of generating a redundancy-reduced data set (RRDS) as output from a multi-dimensional data set (MDDS), wherein the multi-dimensional data set (MDDS) can be processed by a computer system includes one or more physical processors configured to execute executable code, and wherein the computer-implemented method comprises:

obtaining the multi-dimensional data set (MDDS), wherein the multi-dimensional data set (MMDS) includes a set of multiple dimensions, wherein at least one of the dimensions of the multi-dimensional data set (MMDS) includes a set of input variables;

obtaining a set of responses (Y) for the multi-dimensional data set (MDDS), wherein each one of the responses in the set of responses (Y) is one or more quantifiable response values each representing one or more determined prediction values made based on the one or more dimensions of the multi-dimensional data set (MMDS);

obtaining at least one assumption about distribution of: (i) the obtained multi-dimensional data set (MDDS) and (ii) the obtained set of responses (Y); and reducing, the obtained multi-dimensional data set (MDDS) based on the obtained at least one assumption.

* * * * *